United States Patent [19]

Ishikawa et al.

[11] Patent Number: 4,695,898

[45] Date of Patent: Sep. 22, 1987

[54] FACSIMILE MACHINE USING CUT SHEETS OF PAPER

[75] Inventors: Kazumasa Ishikawa, Kawasaki; Yuji Koseki, Machida, both of Japan

[73] Assignee: Ricoh Company, Ltd., Tokyo, Japan

[21] Appl. No.: 875,599

[22] Filed: Jun. 18, 1986

[30] Foreign Application Priority Data

Jun. 20, 1985 [JP] Japan ................................ 60-132943

[51] Int. Cl.$^4$ ......................... H04N 1/21; H04N 1/23; H04N 1/00; H04N 1/40

[52] U.S. Cl. .................................... 358/296; 358/256; 358/280

[58] Field of Search ............... 358/296, 304, 256, 257, 358/280

[56] References Cited

U.S. PATENT DOCUMENTS 4,631,596  12/1986  Yaguchi ........................... 358/280 X
4,644,409  2/1987   Fuchs ............................... 358/280 X

FOREIGN PATENT DOCUMENTS

87675  6/1982  Japan ................................... 358/304
11061  1/1984  Japan ................................... 358/296

Primary Examiner—E. A. Goldberg
Assistant Examiner—Patrick W. Foster
Attorney, Agent, or Firm—Cooper, Dunham, Griffin & Moran

[57] ABSTRACT

A facsimile machine uses cut sheets of recording paper of a predetermined size. If data to be recorded requires a cut sheet of paper of a size larger than the cut sheets of paper of the predetermined size set in the facsimile machine for use, then upon completion of recording part of the data on one of the cut sheets of recording paper of the predetermined size, a predetermined number of lines recorded at the end of the one of the cut sheets of paper are once again recorded at the beginning of the next following cut sheet of paper prior to recording of the following portion of the data to be recorded. In this manner, since that portion of data, which is divided between the two consecutive pages, is recorded twice in accordance with the present invention, no information will be lost even if the data to be recorded is significantly long.

13 Claims, 8 Drawing Figures

FACSIMILE MACHINE USING CUT SHEETS OF PAPER

BACKGROUND OF THE INVENTION

1. Field of the Invention

This invention relates to a facsimile machine using cut sheets of paper for recording output information thereon, and, in particular, to a method and system for outputting data in a facsimile machine using cut sheets of recording paper.

2. Description of the Prior Art

Typically, a facsimile machine uses a roll of recording paper for outputting data thereon and the continuous recording paper stored in the form of a roll is severed appropriately according to the length of an original, whose image information has been transmitted from a facsimile transmitter. Such a structure is advantageous because the length of an original is not fixed and it often varies from one original from another. Even if the length of original varies in this manner, there will be no problem at the facsimile receiver since the continuous recording paper stored in the form of a roll can be severed according to the length of a particular original.

It has been proposed to use cut sheets of recording paper in a facsimile machine. This is not as easy as one would consider as an analogy from a copier. Described more in detail, no problem arises in using cut sheets of recording paper in a facsimile machine if all of originals have the same size, or length. However, experience shows that the size of originals does change often, and the number of different sizes of cut sheets of recording paper to be provided in a facsimile machine is limited. Typically, a facsimile machine may be designed to use two different sizes of cut sheets of paper. It is true that the size may be varied, typically reduced, when recording on a cut sheet of paper. For example, the image information of an original of B4 size may be transmitted from a transmitter facsimile and recorded on a cut sheet of A4 size as reduced at a receiver facsimile, if the receiver facsimile is provided with cut sheets of recording paper of A4 size. If the receiver facsimile is also provided with cut sheets of recording paper of B5 size, then the transmitted information may be selectively recorded on a cut sheet of recording paper of either A4 size or B5 size selectively as appropriately reduced.

However, another problem arises if the original is very long and it is necessary to record output information on two or more cuts sheet of paper at the receiver facsimile. In such a case, since the receiver facsimile cannot determine where the original information should be divided to be recorded on two or more cut sheets of recording paper, there could be a situation where the critical portion of information is divided between two pages, thereby making it difficult or impossible to decipher the original information.

SUMMARY OF THE INVENTION

It is therefore a primary object of the present invention to obviate the disadvantages of the prior art as described above and to provide a method and system for outputting received information on one or two or more cut sheets of paper in a facsimile machine.

Another object of the present invention is to provide a facsimile machine capable of outputting received information as recorded on one or two or more cut sheets of paper, as necessary.

A further object of the present invention is to provide a facsimile machine using cut sheets of recording paper in which the output data would be easy to read has without loss of information.

Other objects, advantages and novel features of the present invention will become apparent from the following detailed description of the invention when considered in conjunction with the accompanying drawings.

DESCRIPTION OF THE PREFERRED EMBODIMENTS

In accordance with the principle of the present invention, if the data to be output requires a longer size than the size of cut sheets of paper mounted in a facsimile machine, then the data is recorded as divided on two or more cut sheets of paper consecutively in such a manner that a predetermined number of last lines of the preceding page are again printed at the beginning of the next succeeding page.

Figure 1:
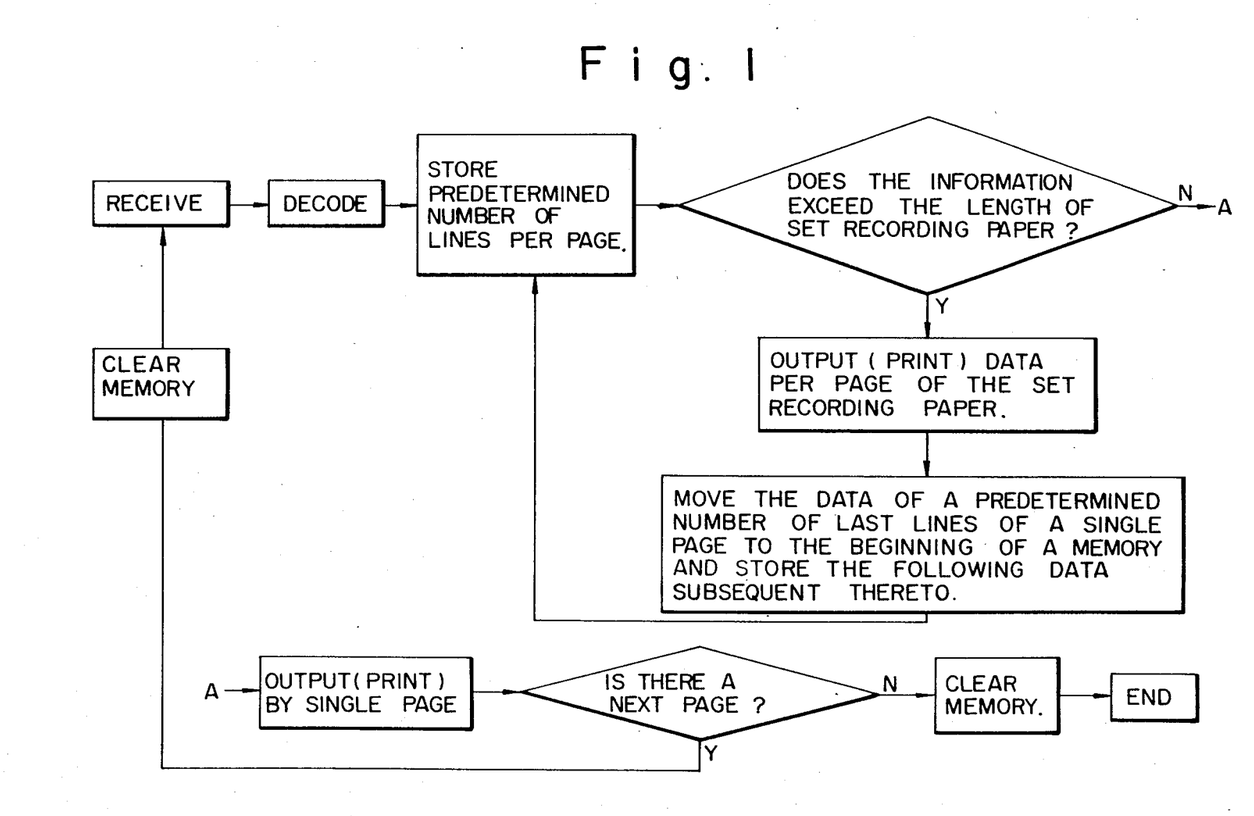
FIG. 1 is a flow chart useful for explaining the principle of the present invention.

Referring now to FIG. 1, there is shown in a flow chart the principle of the present invention. As shown in FIG. 1, at first, data is received by a receiver facsimile machine, and the data received is decoded and stored in a memory provided in the facsimile machine. Then, it is determined whether or not the received data requires a longer-sized cut sheet of paper than the cut sheets of paper mounted in the facsimile machine. And, if the result is affirmative, then received data is partly output as recorded on a first cut sheet of paper over an amount corresponding to the length of the cut sheet of paper mounted in the facsimile machine, and, then, a predetermined number of last lines recorded on the first cut sheet of paper are shifted to the beginning of the memory as followed by the succeeding portion of the received data. Then, it is again determined whether or not the data now present in the memory, i.e., the predetermined number of last lines printed in the first cut sheet of paper and the succeeding portion of the received data, requires a longer-sized cut sheet of paper than the ones mounted in the facsimile machine. In this manner, this process is repeated until all of the received data is recorded on cut sheets of paper as divided.

In the above-described process, one specific mode of determining whether or not the data currently stored in the memory requires a longer-sized cut sheet of paper than those now mounted in the facsimile machine may be constructed by providing a memory having a capacity exceeding one page of the cut sheets of paper mounted in the facsimile machine, wherein it can be determined that the received data requires a longer-sized cut sheet of paper if the memory has become full. In such a structure, after printing a first page, instead of moving a predetermined number of last lines of the memory to the beginning of the memory, a predetermined number of last lines of the first page and the succeeding lines to the end of the memory are moved to the beginning of the memory.

Figure 2:
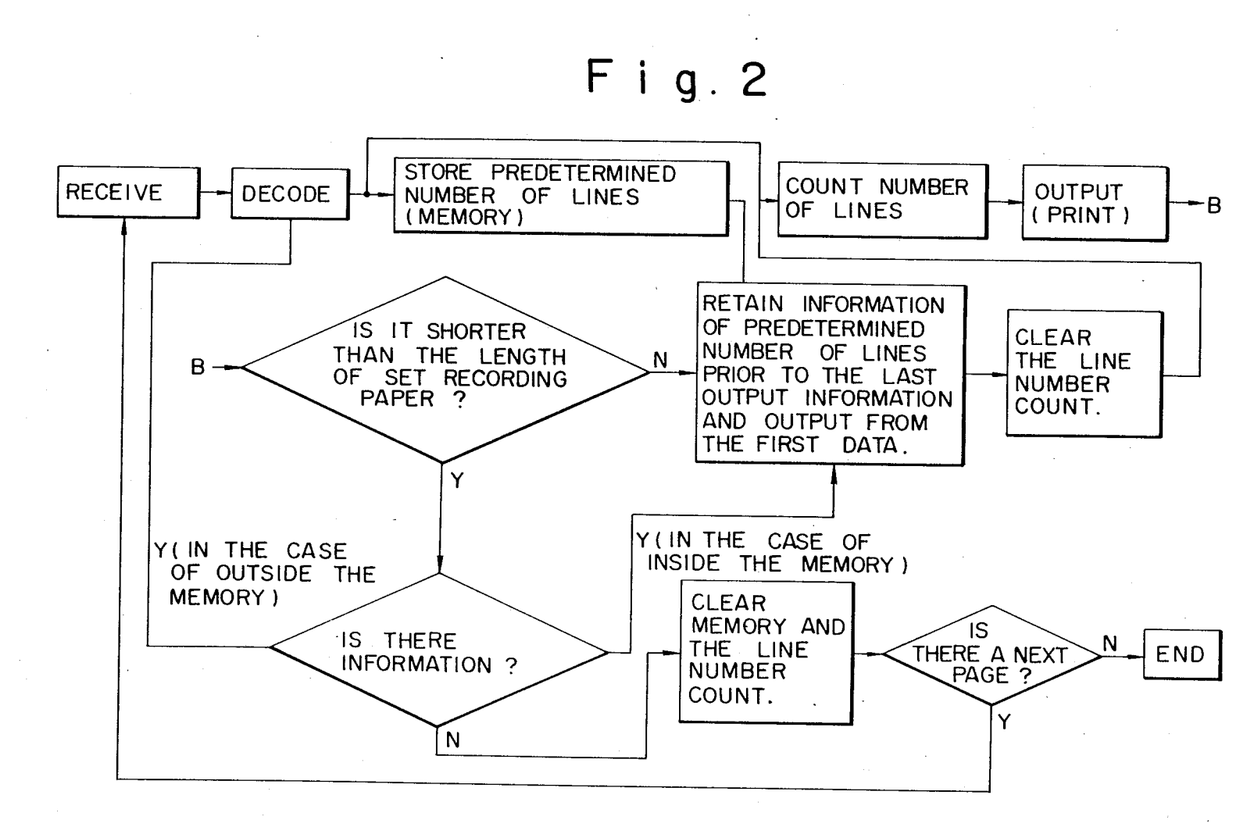
FIG. 2 is a flow chart showing a modification of the structure shown in FIG. 1.
Figure 3:
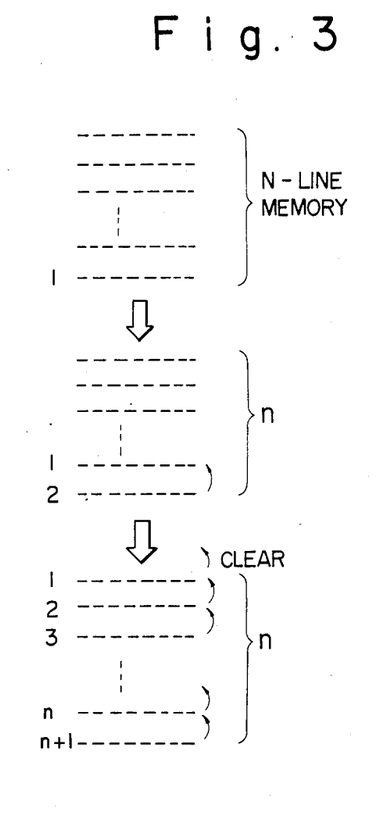
FIGS. 3 through 5 are schematic illustrations which are useful for understanding the principle of the invention shown FIGS. 1 and 2.

FIG. 2 shows a modification of the process shown in FIG. 1, and, in this case, the receiver facsimile machine is provided with a memory having a capacity to store only a predetermined number of lines, typically less than one page. Even in this case, the similar effects can be obtained by providing a structure to count the number of lines. As schematically shown in FIG. 3, the memory in this case stores up to n number of lines from the beginning or end. In the case where the data is stored from the end line toward the beginning line as shown in FIG. 3, if another line is input into the memory after having stored n number of lines, the data in the first line is cleared.

Figure 4:
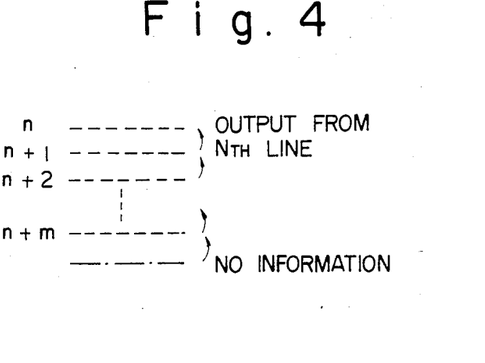
Figure 5:
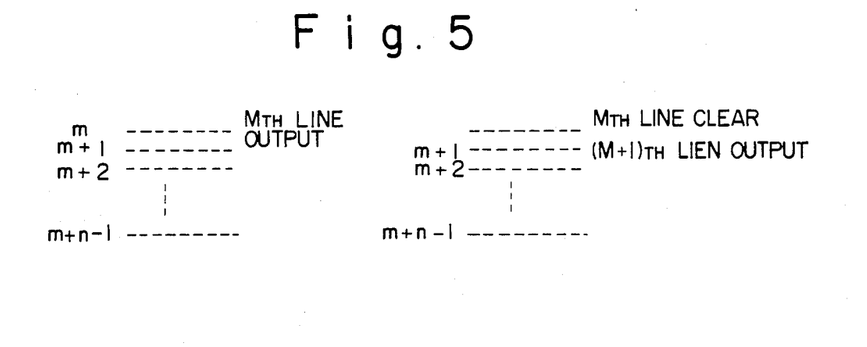

In the case of outputting data from the memory to be used for recording on a cut sheet of paper, the data is output from the first line of the memory and the data of the succeeding lines are shifted to upper lines respectively, as shown in FIG. 4. Or, alternatively, as shown in FIG. 5, the data is output one line after another from the first line to the end line, wherein the line is cleared as soon as its data has been output.

Figure 6:
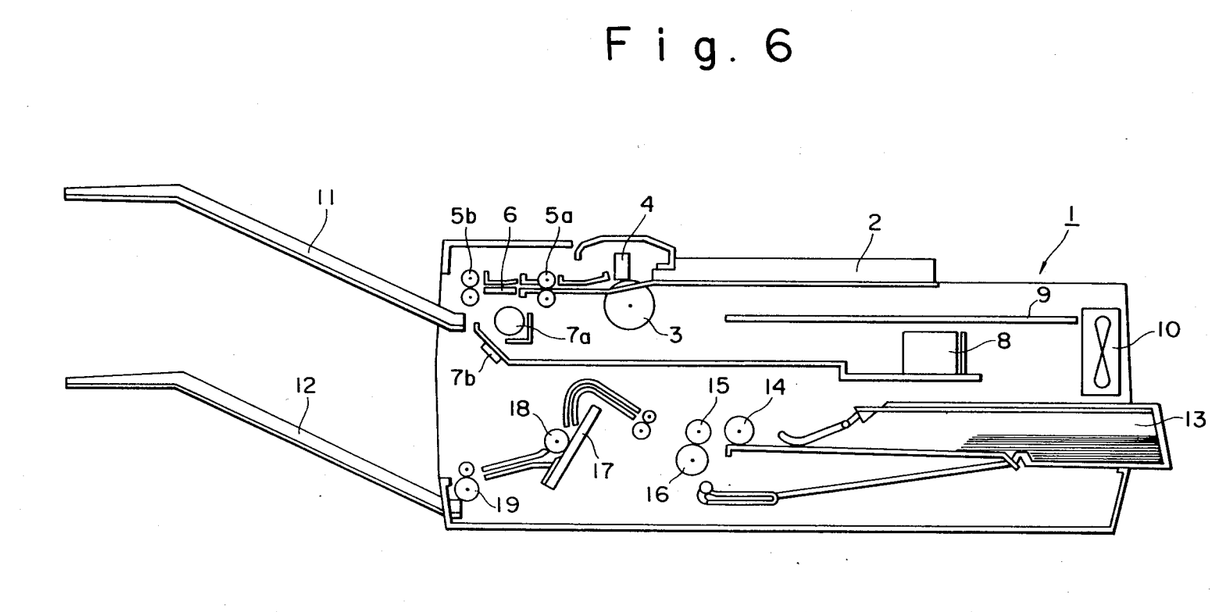
FIG. 6 is a schematic illustration showing the overall structure of a facsimile machine using cut sheets of recording paper constructed in accordance with one embodiment of the present invention.

Now, referring to FIG. 6, there is shown a facsimile machine 1 constructed in accordance with one embodiment of the present invention. As shown, the facsimile machine 1 has a reading section and a recording section, and the upper half of the facsimile machine 1 generally corresponds to the reading section with the lower half generally corresponding to the recording section. Described in more detail, the facsimile machine 1 includes an original guide 2 on which one or more originals may be placed as stacked. The originals on the original guide 2 are fed one by one through cooperation between a separating roller 3 and a separating plate 4, and the original thus fed is transported along a contact glass plate 6 by means of a pair of transporting rollers 5a and 5b. Below the contact glass plate 6 is disposed a fluorescent lamp 7a which illuminates the original being transported along the contact glass plate 6. And the light reflecting from the original being transported along the contact glass plate 6 is reflected by a mirror 7b to be incident on a reading optical system 8, including a CCD and the like.

Above the optical system 8 is disposed a system control printed circuit board 9 provided with various electronics and electrical components to establish a control circuit for controlling the overall operation of the facsimile machine. Beside the board 9 is disposed a fan motor 10 for directing a flow of air in a predetermined direction within the facsimile machine. Another pair of transporting rollers 5b is disposed at the downstream end of the contact glass plate 6 with respect to the advancing direction of the original to be read, and a tray 11 is disposed at the downstream side of the pair of transporting rollers 5b.

Describing the recording section of the facsimile machine 1, below the fan motor 10 is detachably mounted a cassette 13 for storing therein a number of cut sheets of recording paper of predetermined size (e.g., A4 or B4 size) in the form of a stack. With the cassette 13 mounted in a predetermined position inside of the facsimile machine 1, the sheet supplying end of the cassette 13 is located in the vicinity of a pick-up roller 14 which causes the cut sheets of paper stored in the cassette 13 to be fed one by one toward a pair of transport roller 15 and separating roller 16. Even if two or more cut sheets of paper happen to be fed at the same time for some reason, the separating roller 16 insures that only one cut sheet of paper be fed and transported at a time. Downstream of the pair of rollers 15 and 16 with respect to the advancing direction of a cut sheet of paper supplied from the cassette 13, there is disposed a thermal print head 17, and a platen roller 18 is also provided as pressed against the thermal print head 17. Furthermore, a pair of paper discharging rollers 19 and a paper discharging tray 12 are also provided downstream of the thermal print head 17.

With such a structure, image data received from a transmitter facsimile machine or obtained by reading an original being transported along the contact glass plate 6 through the reading optical system 8 in a copy mode is supplied to the thermal print head 17 for recording on one or more of cut sheets of paper supplied from the cassette 13.

Figure 7:
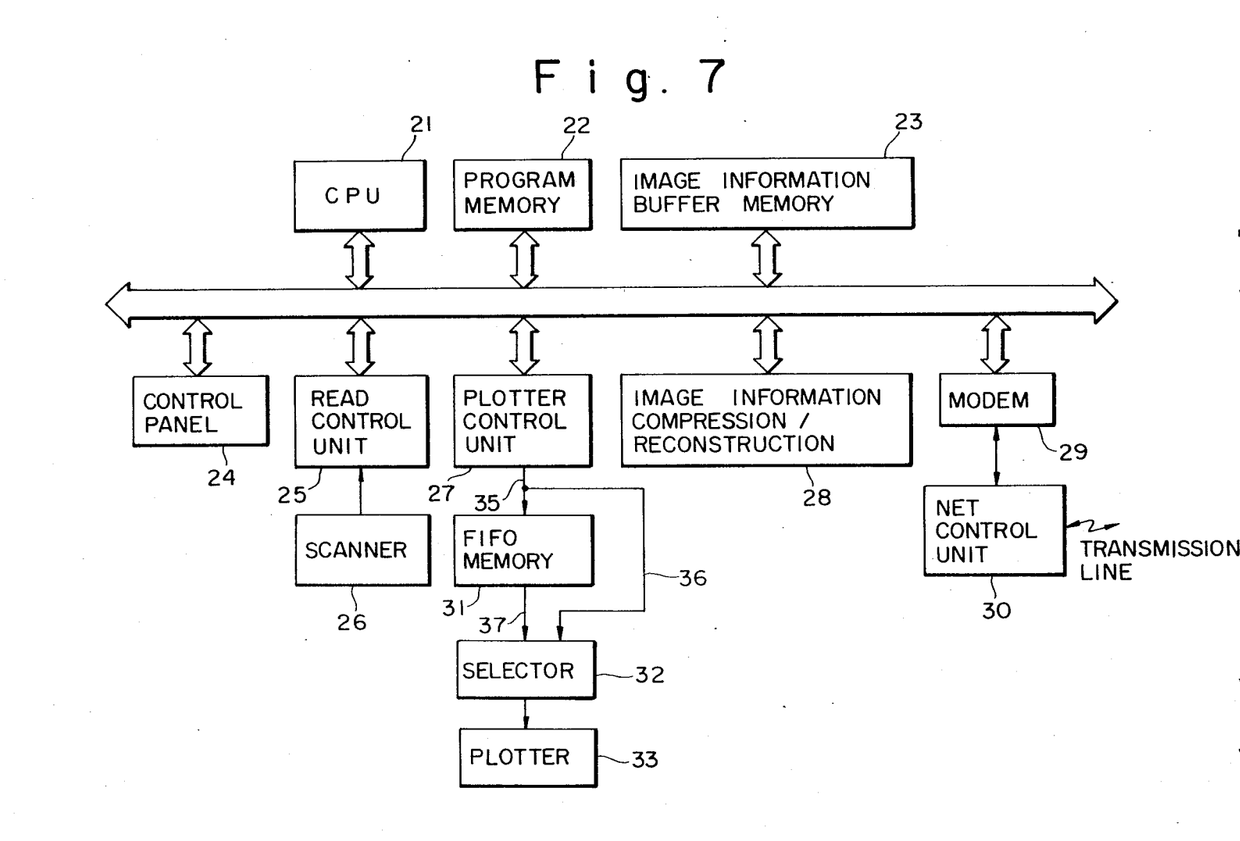
FIG. 7 is a block diagram showing a control system provided in the facsimile machine shown in FIG. 6 for controlling operation thereof.

FIG. 7 shows in block form a control system provided in the facsimile machine 1 shown in FIG. 6, and the majority portion thereof is provided on the printed circuit board 9. The control system shown in FIG. 7 includes a central processing unit or simply CPU 21 in charge of an overall control of the facsimile machine 1, a program memory 22 storing therein a predetermined program, and an image buffer memory 23. The control system of FIG. 7 further includes a control panel 24 as an interface with an operator and the facsimile machine 1, a scanner 26 for scanning an original, and a read control unit 25 for controlling the operation of the scanner 26. Also provided in the control system of FIG. 7 is a plotter 33 (corresponding to the thermal print head 17 of FIG. 6) for recording output data on a cut sheet of recording paper, wherein the plotter 33 records the image information stored in the image information buffer memory 23 on a cut sheet of recording paper under the control of a plotter controller 27. Also provided are an image information compression/reconstruction unit 28, a MODEM 29, and a net control unit 30, which are in charge of data transmission/reception control of the facsimile machine 1.

Also as shown in FIG. 7, a first-in-fast-out or simply FIFO memory 31 and a selection circuit or selector 32 are provided as connected between the plotter controller 27 and the plotter 33, wherein the plotter controller 27 is connected not only to the FIFO memory 31 by a line 35, but also to the selector 32 by a line 36, and the FIFO memory 31 is connected to the selector 32 by a line 37.

Figure 8:
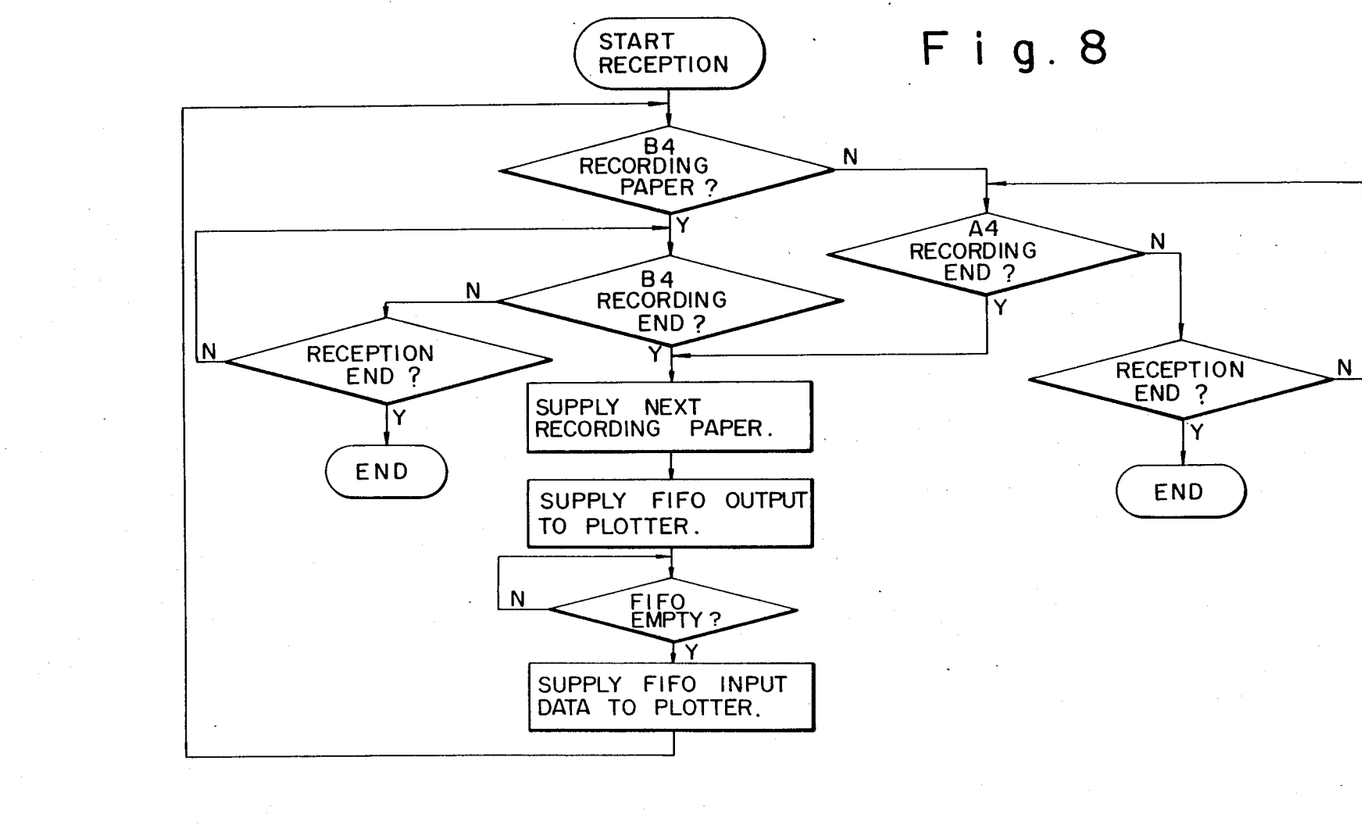
FIG. 8 is flow chart useful for explaining the operation of the control system shown in FIG. 7.

Now, the operation of the structure shown in FIG. 7 will be described with reference to the flow chart shown in FIG. 8. The data transmitted from a transmitter facsimile machine is supplied to the MODEM 29 through the net control unit 30, where the received data is demodulated to digital data which in turn is reproduced by the image information compression/reconstruction unit 28 in the form of image information before having been coded. The image information thus reconstructed in this manner is once stored in the image information buffer memory 23 so as to adjust the speed of the plotter 33, and, then, it is supplied to the FIFO memory 31 and also to the selector 32. At first, the selector 32 selects the line 36 which is common with the FIFO input line 35 and thus maintains the FIFO output line 37 deselected. Accordingly, the data supplied to the FIFO memory 31 is also supplied to the selector 32 through the line 36 and then to the plotter 33 where the data is recorded on a cut sheet of paper. At the same time, the same data is supplied into the FIFO memory 31 and stored therein.

When the FIFO memory 31 becomes full, the current oldest data is discarded if the next fresh data is supplied through the line 35. The data thus discarded is not supplied to the selector 32. Thus, the FIFO memory always stores the up-to-date data of the amount corresponding to the capacity of the FIFO memory 31. Upon completion of recording of data on a cut sheet of data of predetermined size, such as A4 and B4, in this manner, the next succeeding cut sheet of paper is supplied. At the same time, the selector 32 switches from the line 36 to the line 37 and the data then stored in the FIFO memory 31 is first supplied to the plotter 33 to be recorded at the beginning of the next succeeding cut sheet of paper. In this instance, the transfer of image data from the image information buffer memory 23 to the FIFO memory 31 is halted. The data then stored in the FIFO memory 31 corresponds to a predetermined number of last lines of the data recored on the preceding cut sheet of paper, so that the predetermined number of last lines (determined by the memory capacity of the FIFO memory 31) of the data recorded on the preceding page are once again recorded at the beginning of the next page.

When the FIFO memory 31 becomes empty, the selector 32 causes the line 36 to be selected while setting the line 37 to be deselected, thereby resuming the transfer of the data in the image information buffer memory 23 to the FIFO memory 31 and the recording operation by the plotter 33.

As described above, in accordance with the present invention, in a facsimile machine using cut sheets of recording paper, even if the data to be recorded is long and requires a longer-sized cut sheet of paper than those set ready for use, the data can be properly recorded on two or more cut sheets of paper without presenting any difficulty in reading and causing damage or loss of information. Besides, a tolerance for the top and bottom margins of a cut sheet of paper is increased, so that the timing of supply of a cut sheet of paper and the positioning of the start of recording on a cut sheet of paper may be relaxed without causing any problem to recorded information.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A method for recording data in a facsimile machine using cut sheets of recording paper of a predetermined size, comprising the machine-implemented steps of:
   determining whether or not a larger cut sheet of paper is required for recording said data than said predetermined size; and
   recording a predetermined number of lines recorded at the end of a cut sheet of recording paper at the beginning of a next cut sheet of recording paper if a larger cut sheet of paper is required for recording said data than said predetermined size.

2. A recording system of a facsimile machine using cut sheets of recording paper of a predetermined size, comprising;
   first storing means for storing data to be recorded;
   second storing means for storing a predetermined amount of said data as transferred from said first storing means;
   recording means connected to said first and second storing means for recording said data on one or more of said cut sheets of recording paper depending on the quantity of said data; and
   control means for controlling the supply of said data among said first, second and recording means such that said data is supplied from said first storing means to said recording means and at the same time to said second storing means until completion of recording of one of said cut sheets of recording paper, and, then, that portion of said data not stored in said second storing means is first supplied to said recording means for recording on another of said cut sheets of recording paper prior to the supply of the following portion of said data from said first storing means to said recording means and also to said second storing means.

3. The system of claim 2 wherein said first storing means includes a buffer memory for storing said data to be recorded in its entirety.

4. The system of claim 3 wherein said second storing means includes a FIFO memory having a predetermined capacity.

5. The system of claim 4 wherein said control means includes a controller connected between said buffer memory and said FIFO memory, a selector connected between said FIFO memory and said recording means, and a bypass line connected between a line interconnecting said controller to said FIFO memory and said selector.

6. A facsimile machine for receiving data defining facsimile lines which collectively define a transmitted image and for recording a facsimile of the transmitted image on one or more cut sheets each of which has a selected image size, comprising:
   means for receiving said data;
   means responsive to the receiving means to record a facsimile of at least an initial portion of the transmitted image on a first cut sheet; and
   means for (a) determining if the received data define a transmitted image whose size is greater than the image size of a first cut sheet and (b) in case the size of the transmitted image is greater, causing the recording means to record on the first cut sheet as much of the transmitted image as will fit thereon and for recording on a second cut sheet (i) a selected number of the facsimile lines already recorded at the end of the first cut sheet and (ii) at least a portion of the remainder of the transmitted image.

7. A fasimile machine as in claim 6 in which the determining and causing means comprises a memory which stores at least data defining said selected number of facsimile lines already recorded at the end of the first cut sheet.

8. A facsimile machine as in claim 7 in which the memory stores the number of facsimile lines which define an image corresponding to the image size of a cut sheet.

9. A facsimile machine as in claim 8 in which the memory is a FIFO memory by facsimile line.

10. A method of receiving data defining facsimile lines which collectively define a transmitted image and of recording a facsimile of the transmitted image on one or more cut sheets each of which has a selected image size, comprising:

receiving said data and recording a facsimile of at least an initial portion of the transmitted image on a first cut sheet; and determining if the received data define a transmitted image whose size is greater than the image size of a first cut sheet and, in case the size of the transmitted image is greater, recording on the first cut sheet as much of the transmitted image as will fit thereon and recording on a second cut sheet (i) a selected number of the facsimile lines already recorded at the end of the first cut sheet and (ii) at least a portion of the remainder of the transmitted image.

11. A method as in claim 10 in which the determining and causing step comprises storing in a memory at least the data defining said selected number of facsimile lines already recorded at the end of the first cut sheet and reading the stored data and recording the beginning of the second cut sheet on the basis of the data read out of said memory.

12. A method as in claim 11 in which the step of storing data in said memory comprises storing in the memory the number of facsimile lines which define an image corresponding to the image size of a cut sheet.

13. A method as in claim 12 in which the storing step comprises storing in a FIFO memory.

* * * * *